Figure 1:
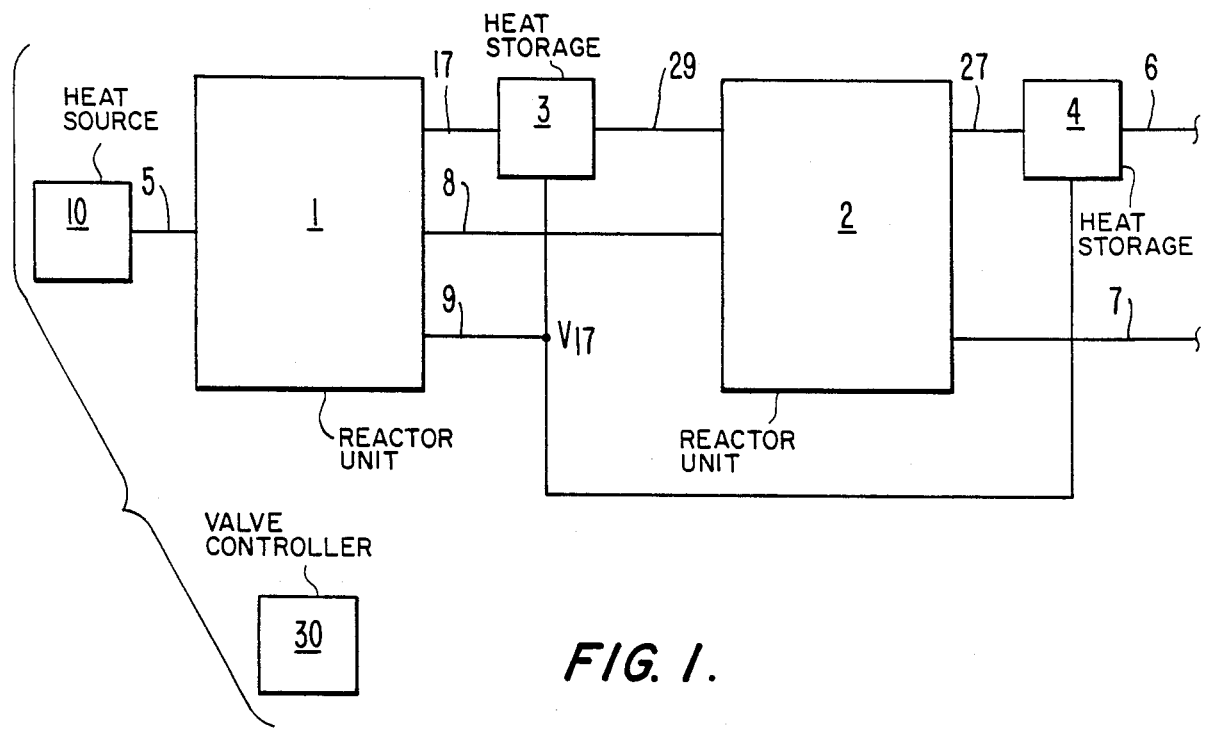

United States Patent [19]

Paeye et al.

[11] Patent Number: 4,765,395
[45] Date of Patent: Aug. 23, 1988

[54] DEVICE FOR THE CONTINUOUS PRODUCTION OF HEAT AND COLD

[75] Inventors: Gerard Paeye, Carquefou; Francis Meunier, Paris, both of France

[73] Assignee: Jeumont-Schneider Corporation, Puteaux cedex, France

[21] Appl. No.: 925,746

[22] Filed: Oct. 30, 1986

[30] Foreign Application Priority Data

Nov. 19, 1985 [FR] France ............................ 85 17053

[51] Int. Cl.$^4$ ..................... F25B 17/08; F25B 29/00
[52] U.S. Cl. ........................... 165/104.12; 62/335; 62/480
[58] Field of Search ............... 165/104.12; 62/480, 62/335

[56] References Cited

U.S. PATENT DOCUMENTS

| | | | |
|---|---|---|---|
| 4,183,227 | 1/1980 | Bouvin et al. | 62/480 |
| 4,410,028 | 10/1983 | Alefeld et al. | 165/104.12 |
| 4,441,332 | 4/1984 | Wilkinson | 62/335 |
| 4,523,635 | 6/1985 | Nishizaki et al. | |
| 4,548,046 | 10/1985 | Brandon et al. | 62/480 |
| 4,594,856 | 6/1986 | Rothmeyer | 62/480 |
| 4,610,148 | 9/1986 | Shelton | 62/480 |

FOREIGN PATENT DOCUMENTS

| | | |
|---|---|---|
| 0071271 | 2/1983 | European Pat. Off. |
| 0131869 | 1/1985 | European Pat. Off. |
| 680894 | 1/1930 | France |
| 747191 | 3/1933 | France |
| 2157415 | 10/1985 | United Kingdom |

Primary Examiner—Albert W. Davis, Jr.
Attorney, Agent, or Firm—Rines and Rines, Shapiro and Shapiro

[57] ABSTRACT

A device for continuous production of heat and cold comprises a combination of an external heat source (10), at least first and second units (1, 2) each of which operates by using different solid-fluid adsorbent-refrigerant pairs, and each of which includes two reactors (11, 12; 21, 22) containing the same solid adsorbent, a condenser (13, 23) and an evaporator (14). The reactors of the first unit (1) are connected alternately to the external heat source (10) and the heat recovered from the first unit (1) is used to heat alternately the reactors of the second unit (2). Heat may be tapped at the condensers, and cold may be tapped at the evaporators.

12 Claims, 3 Drawing Sheets

DEVICE FOR THE CONTINUOUS PRODUCTION OF HEAT AND COLD

This invention concerns a device for the continuous production of heat and cold from a heat source.

Generally, to produce heat and cold at the same time, electric heat pumps are used. This solution is unsuitable when capability to use sources of energy other than electricity is desired.

Adsorption systems also permit the simultaneous production of heat and cold. For example, French Pat. No. 2 465 970 describes a process of refrigeration based on solid adsorbents that makes use of two tanks, each containing the same solid adsorbent and operating alternately in adsorption and then in desorption. The temperature levels that can be supplied by the system are a function of the solid adsorbent chosen and have an effect on the coefficient of performance of the device. In this case, the essential problems to be resolved are, on the one hand, the adaptation of the temperature levels supplied by the system to the demand of the user, and on the other hand, obtaining adequately high efficiencies.

In summary this invention solves these two problems by means of a thermodynamic cycle making use of reactors in cascade, each using a solid adsorbent and fluid refrigerant, and by optimized use of heat exchanged between the reactors themselves and heat exchanged between the reactors and the external heat sources.

This optimization is obtained by adapting the temperatures of operation (temperatures of condensation, evaporation, and adsorption) for each of the adsorbent-refrigerant pairs. The device pursuant to this invention offers numerous degrees of freedom and accordingly permits adjustment to particular operating conditions more readily than in the case of heat pumps in series.

In the present case, the optimization is obtained by tapping useful heat not only at the condensers, but also at the reactors in their cooling phases; this process makes it possible to obtain relatively high temperatures of use.

Accordingly, an object of this invention is to provide a device for the continuous production of heat and cold comprising a combination of an external heat source, at least first and second units that operate using different solid-fluid adsorbent-refrigerant pairs, each of which has at least two reactors containing the same solid adsorbent, a condenser and an evaporator, with the reactors of the first unit being connected alternately to the external heat source, and with the heat recovered from the first unit serving to heat alternately the reactors of the second unit.

This invention will be better understood and other objectives, benefits, and characteristics will become more clearly evident from the specification that follows, to which are attached a number of drawings by way of example.

Figure 2:
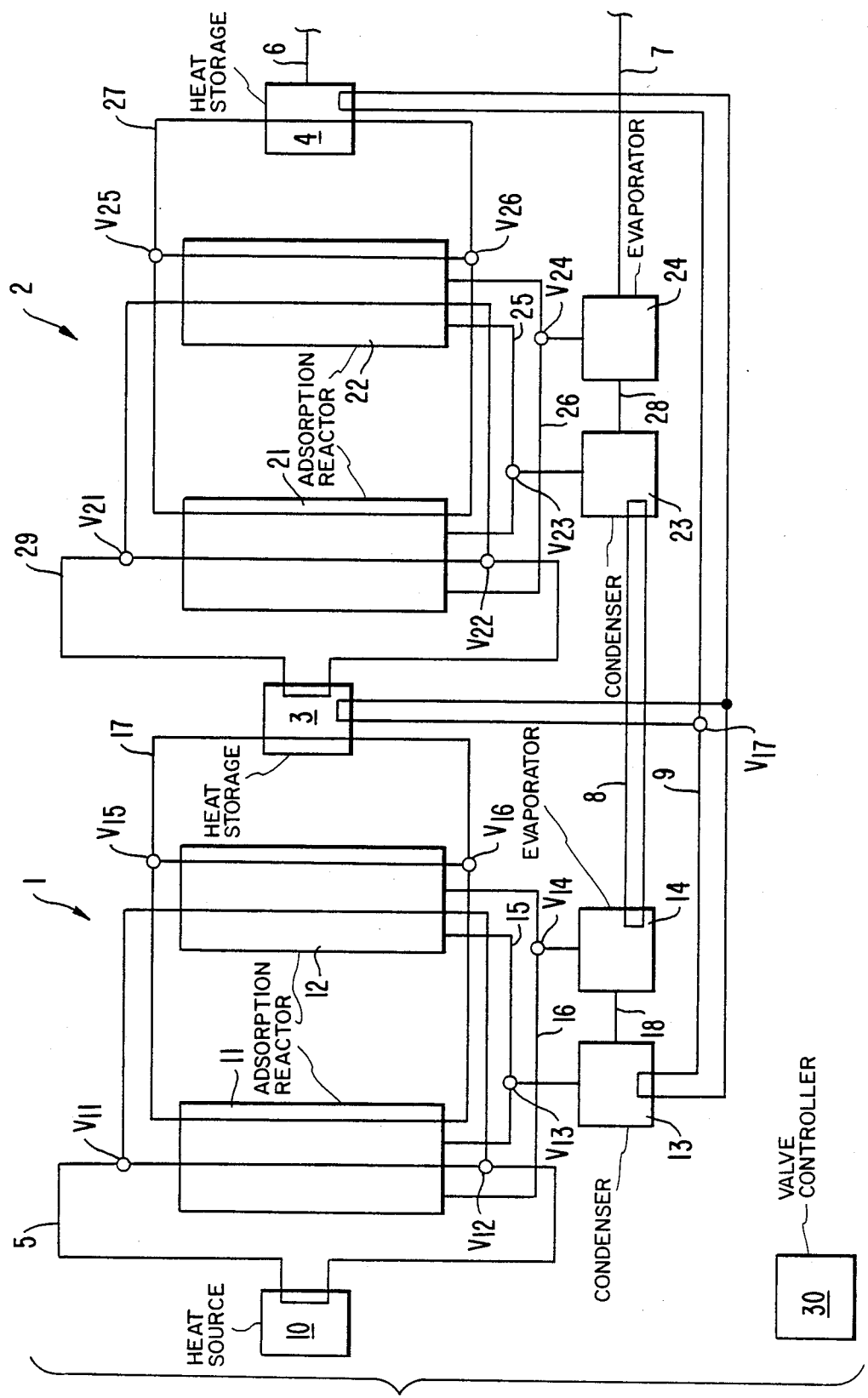

FIG. 1 shows schematically a device conforming to this invention, and FIG. 2 shows in a detailed manner an example of an embodiment of such a device.

Figure 3:
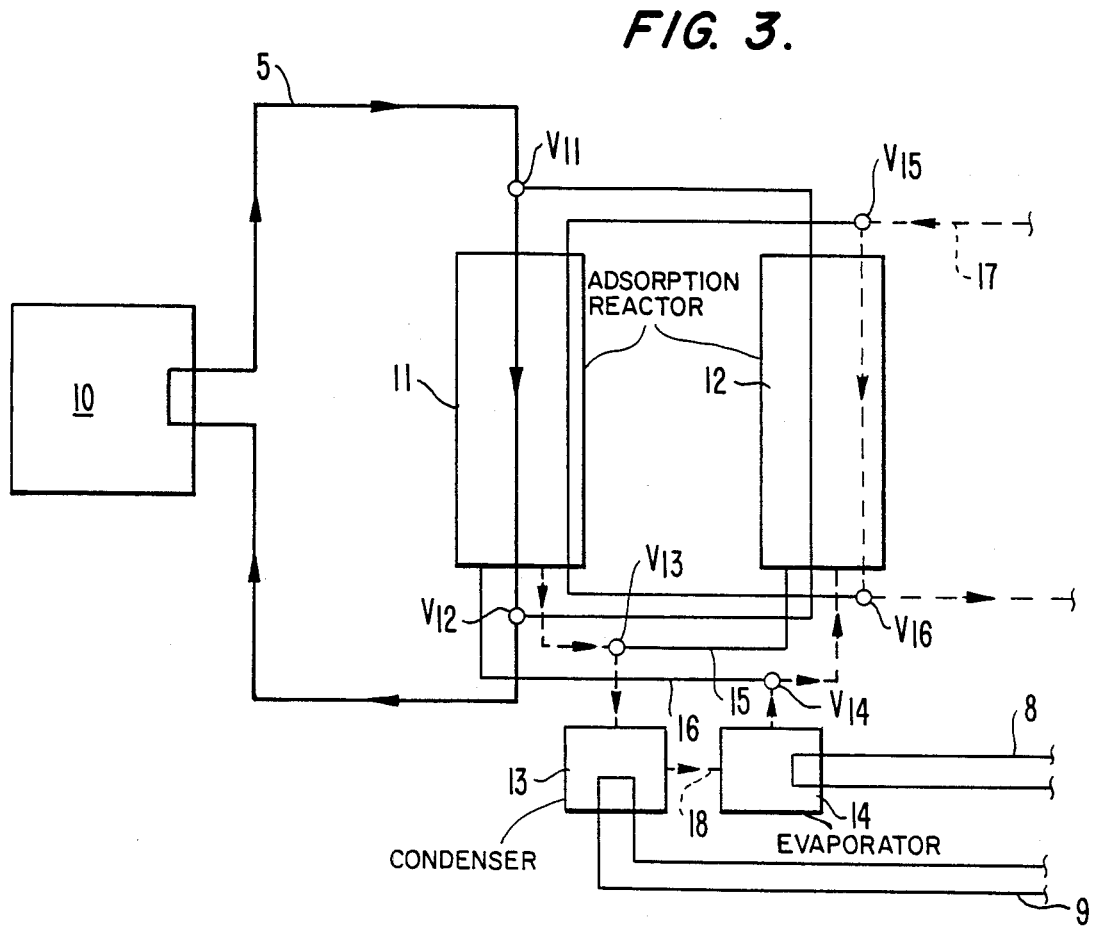
Figure 4:
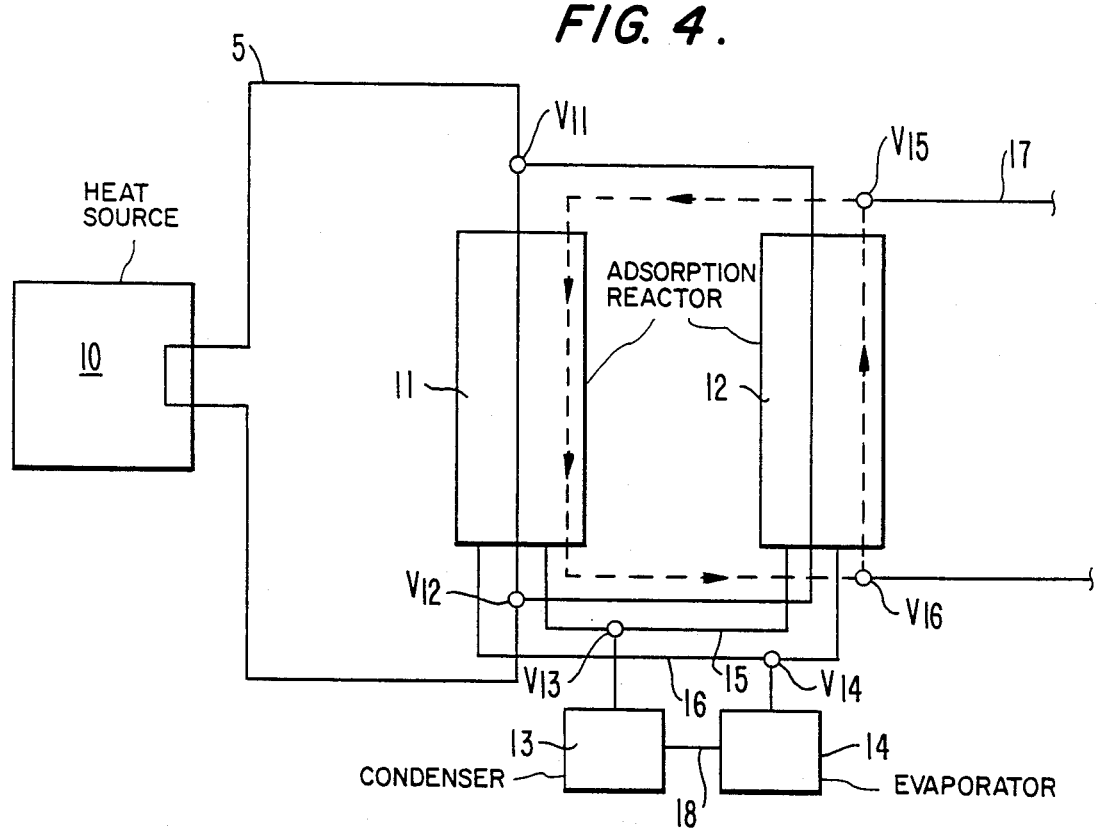
Figure 5:
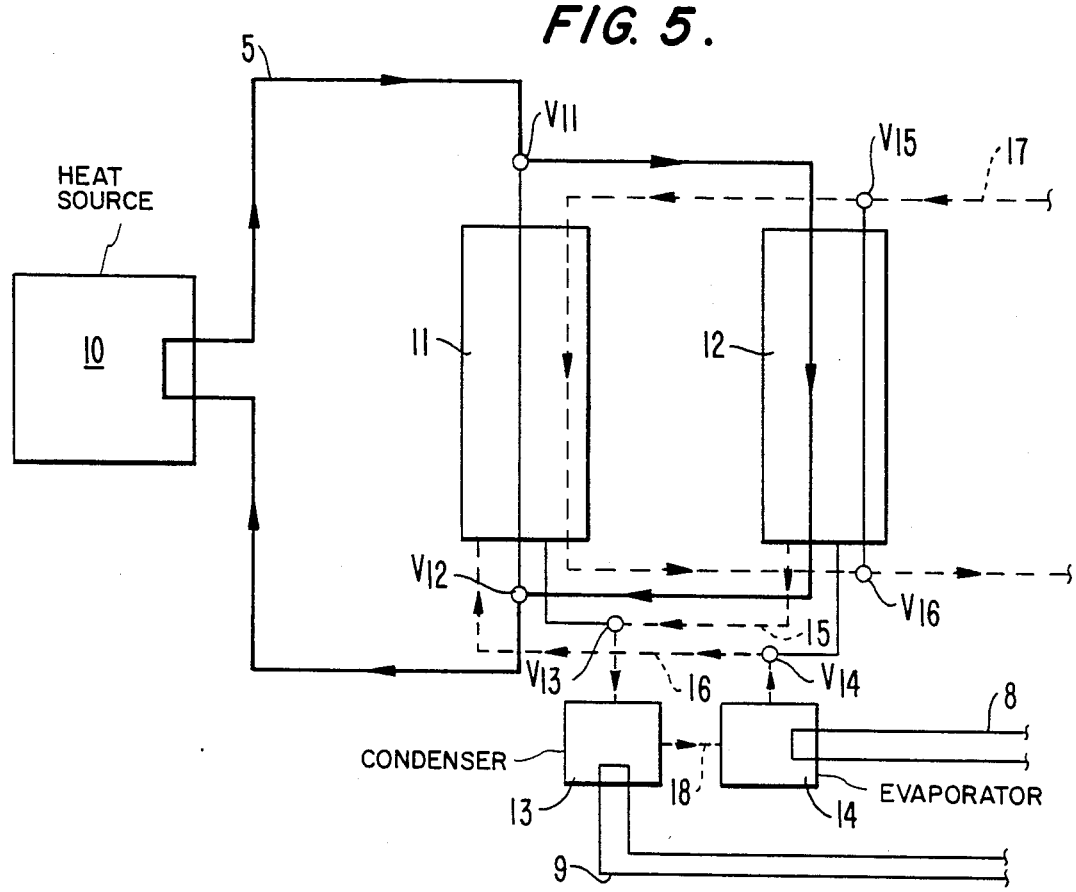

FIGS. 3, 4, and 5 illustrate the three phases of an operating cycle of the first reactor unit of such a device.

In the different figures, corresponding elements are designated by the same numerical references and all of the valves mentioned in the specification below and in the drawings are three-way valves.

A device conforming to this invention will now be described with reference to FIG. 1. The invention is not limited to this device, and it is possible for example to modify the number of reactor units, but the number should not be less than two so that the device has at least two units operating with different solid-liquid adsorbent-refrigerant pairs.

Reference numeral 10 denotes a heat source, which in this example is taken to be a boiler. Boiler 10, which can be powered by different sources of energy for economic reasons, for example gas and/or electricity, is coupled by a circuit 5 to a first unit 1 comprising at least two reactors, an evaporator and a condenser, and operating by the use of a first solid-fluid adsorbent-refrigerant pair. This unit 1 is coupled by a circuit 8 to a second unit 2 also comprising at least two reactors, an evaporator and a condenser, but operating with the use of a different solid-fluid adsorbent-refrigerant pair. Unit 1 is also coupled by a circuit 9 and a valve V17 to a heat-storage device 4.

Another heat-storage device 3 may also be provided, in which case the unit 1 is coupled to it on the one hand by a circuit 17 and, if desired, by the circuit 9 and the valve V17. The storage device 3 then constitutes the heat source of the unit 2 to which it is coupled by a circuit 29.

If the storage device 3 is not provided, the unit 1 is coupled directly to the unit 2 by the circuits 17 and 29, which are then combined to feed the heat delivered by the unit 1 to the unit 2.

The unit 2 is coupled to the storage device 4 by a circuit 27.

The heat produced by the device is tapped from the heat-storage device 4 by a utilization circuit 6, with the cold being tapped at the evaporator of the unit 2 by a circuit 7. More generally, the device produces cold at the evaporators and heat at the condensers and the reactors.

An automatic control 30 of any suitable type controls the operation of the device.

A device pursuant to FIG. 1 will now be described in more detail with reference to FIG. 2, which shows an example of an embodiment of the invention. The invention is not limited to this example, and it is possible for instance to modify the number of reactors of each unit, provided that the number should not be less than two so that the reactors can operate alternately. Also, in this example, the heat-storage device 3 has been provided in order to describe the device in its most complete form, but it will be obvious to those skilled in the art that this storage system is not indispensable for the operation of the device. Furthermore, it will be recalled that a principal objective of the device pursuant to the invention is that it can be adapted to supply temperature levels corresponding to the needs defined by the user. To this end, while retaining the general structure of the device such as that shown in FIG. 1, it is possible to adapt the number of reactors in each unit, to choose the solid-liquid refrigerant adsorbent couples used in the units 1 and 2 in an appropriate manner, and finally to choose the points of use as a function of the different temperature levels desired.

Referring now to FIG. 2, the illustrative embodiment designed to supply cold at $-10°$ C. and heat at $70°$ C.

For this purpose, the solid-fluid adsorbent-refrigerant pair of the first unit is zeolite-water, and that of the second unit is activated charcoal-methanol.

The boiler 10 heats a heat-carrier liquid such as an oil that circulates in the circuit 5 at a temperature of approximately 300° C.

The references 11 and 12 identify two reactors containing zeolite in which flow alternately the heat-carrier liquid in the circuit 5 which couples each reactor 11, 12 respectively, to the boiler 10 through two valves V11 and V12, and another heat-carrier liquid in a circuit 17 that couples each reactor 11, 12, respectively, to the heat-storage device 3 through two valves V15 and V16.

Each reactor 11, 12 in turn is connected to a condenser 13 through a line 15 and a valve V13, and to an evaporator 14 through a line 16 and a valve V14. The condenser 13 is connected to the evaporator 14 by a line 18. The water associated with the zeolite circulates through the lines 15, 16, and 18.

The unit 2 in this case is of the same design as the unit 1, with the references 21 to 28 and V21 to V26 identifying elements corresponding to those identified by the references 11 to 18 and V11 to V16.

The reactors 21 and 22 of the unit 2 contain activated charcoal as indicated above, and the methanol associated with the activated charcoal circulates through lines 25, 26, and 28.

The storage device 4 serves a purpose for the unit 2 identical to that of the storage device 3 for the unit 1, and the line 29 and the storage device 3 play serve a purpose for the unit 2 identical to that of the boiler 10 and of the circuit 5 for the unit 1.

The heat collected by the condenser 13 is transferred through the circuit 9 nd the valve V17 respectively to the storage device 3 and to the storage device 4.

Preferably, a circuit 8 during certain phases permits transferring the cold collected in the evaporator 14 to the condenser 23.

The heat produced heats water in the storage device 4, from which the heat is tapped by means of a utilization circuit 6; the cold is tapped from the evaporator 24 by means of the circuit 7.

The switching of the valves V11 to V17 and V21 to V26 is controlled by an automatic regulator 30 whose connections are not shown.

The manner in which the heat and cold are generated by the device will now be described. For this purpose, the operation of the unit 1 will be described first, with reference to FIGS. 3 to 5; it comprises three steps.

Step 1: Reactor 11 in desorption and reactor 12 in adsorption (FIG. 3)

The heat-carrier liquid circulating in the closed circuit 5 is heated in the boiler 10, passes through the reactor 11, and then arrives at the valve V12, and from there it returns to the boiler 10. The heating circuit 5 is shown in bold solid lines.

The passage of the heat-carrier liquid heats the zeolite, which emits steam by desorption. The steam reaches the condenser 13 through the line 15 and the valve V13 and condenses there. Since condensation is an exothermic process, the liquid flowing in the circuit 9 is heated at the time of its passage through the condenser 13. The condensed water reaches the evaporator 14 through the line 18, and vaporizes. Since evaporation is an endothermic process, the liquid circulating in the circuit 8 is cooled during its passage through the evaporator 14. The steam then reaches the reactor 12 through the line 16 and the valve V14 and is then adsorbed by the zeolite contained in this reactor. The flow of the fluid refrigerant associated with the zeolite, which is water, is shown by bold broken lines.

Since adsorption is an exothermic reaction, the liquid circulating in the circuit 17 and passing through the reactor 12 by way of the valves V15 and V16 is heated during its passage through this reactor. The heat recovery circuit is shown in fine broken lines.

When the zeolite contained in the reactor 11 is almost completely desorbed, the valves V11 to V16 are switched to terminate the adsorption phase when its efficiency is too low.

In practice, sudden reversal of the cycle causes heat losses that involve a reduction of the coefficient of performance. Thus, it is preferred to employ an intermediate operating phase before fully reversing the cycle. The advantages of such an intermediate step are addressed in French Pat. No. 2 465 970.

Step 2: Intermediate step (FIG. 4)

The valves V15 and V16 are switched so that the liquid flowing in the circuit 17 passes through the two reactors 11 and 12. The circuit of this liquid is shown in broken lines.

The passage of the liquid permits transferring a portion of the sensible heat originating from the cooling of the reactor 11 to the reactor 12, and likewise a portion of the latent heat of adsorption.

Thus, the reactor 12 is first heated, with partial desorption, without providing external energy, which increases the coefficient of performance of the device.

When the temperature of the zeolite in the reactor 12 is almost equal to that of the zeolite contained in the reactor 11, the valves V11 to V16 are switched to reverse the cycle relative to the first step and to accomplish the third step.

Step 3: Reactor 11 in adsorption and reactor 12 in desorption (FIG. 5)

The heat-carrier liquid circulates in the circuit 5 of the boiler 10 up to the valve V11, passes through the reactor 12, reaches the valve V12, and returns to the boiler 10. The heating circuit 5 is shown in bold solid lines.

The refrigerant fluid leaves the reactor 12, reaches the condenser 13, passing through the valve V13 and the line 15, and then enters the evaporator 14 through the line 18 and is sent to the reactor 11, passing through the valve V14 and the line 16. The circuit of the refrigerant liquid is shown in bold broken lines. The heat-recovery liquid flowing in the circuit 17 passes through the reactor 11, passing through the valves V15 and V16. The heat-recovery circuit is shown with fine broken lines.

The liquid circulating in the circuit 9 is heated during its passage through the condenser 13, and the liquid circulating in the circuit 8 is cooled during its passage through the evaporator 14.

The operation is identical in principle to that of the first step.

It can be seen from the description of the operation of the unit 1 that starting with the heat supplied by the boiler 10, which heats the heat-carrier liquid in circuit 5 to a temperature of approximately 300° C.:

heat is produced:

alternately at the reactors 11 and 12, with this heat being transferred to the storage device 3 by means of the liquid flowing in the circuit 17 with a temperature approximately between 170° C. and 120° C.; and at the condenser 13, with this heat being transferred by means of the liquid flowing in the circuit 9, on the one hand, to the storage device 3 when the temperature of the liquid is above 120° C., and on the other hand, to the storage device 4 when the temperature of the liquid is approximately between 120° C. and 70° C.

Cold is produced at the evaporator 14, with this cold being transferred to the condenser 23 of the unit 2 so as to cool it, by means of the liquid flowing in the circuit 8 with a temperature approximately between 20° C. and 40° C.

The manner of operation of the second unit 2 is identical to that of the unit 1, with the storage device 3 playing a role identical to that of the boiler 10 but heating the heat-carrier liquid flowing in the circuit 29. The structure of circuit 29 is identical to that of the circuit 5, and storage device 3 heats the carrier liquid of circuit 29 to a temperature of the order of 120° which is adequate to provide for the desorption of the activated charcoal without being so high as to cause partial decomposition of the methanol.

The storage device 4, which plays a role identical to the storage device 3, permits heating of the water available in the utilization circuit 6 to a temperature of approximately 70° C.

Finally, the evaporator 24 supplies to the circuit 7 a liquid at a temperature of approximately −10° C.

Although specific means of implementation have been described, it will be apparent that various modifications may be made by one skilled in the art in keeping with the same concept without departing from the scope of this invention.

We claim:

1. A device for continuous production of heat and cold, comprising:
   a first adsorption reactor unit and a second adsorbtion reactor unit,
   each said reactor unit including condenser means, evaporator means coupled to said condenser means to receive refrigerant fluid therefrom, and a plurality of adsorption reactors all utilizing the same solid-fluid adsorbent-refrigerant pair, with the adsorbent-refrigerant pair of said first reactor unit being different from that of said second reactor unit,
   each said reactor unit further including means operatively coupling each reactor thereof to the corresponding condenser means for operation in a desorption mode and simultaneously coupling another reactor thereof to the corresponding evaporator means for operation in an adsorption mode, so that refrigerant desorbed from the reactor in the desorption mode passes through the corresponding condenser means and evaporator means and is adsorbed by the reactor in the adsorption mode, said coupling means alternating each reactor selectively between the corresponding condenser means and evaporator means such that each reactor operates alternately in said desorption mode and said adsorption mode, and means operating to couple and uncouple each reactor to and from a heat source for operation of that reactor in said desorption mode and said adsorption mode, respectively,
   the heat source for said first reactor unit being an external heat source, and the heat source for said second reactor unit being a heat output of said first reactor unit, whereby said reactor units operate in cascade.

2. A device according to claim 1, including means coupling said evaporator means of said first reactor unit to said condenser means of said second reactor unit for transmitting cooling from said evaporator means of said first reactor unit to said condenser means of said second reactor unit.

3. A device according to claim 1, including heat-recovery fluid circuit means coupling the selected reactor of said first reactor unit in the adsorption mode to the selected reactor of said second reactor unit in the desorption mode for conveying recovered heat of adsorption from the former reactor to the latter.

4. A device according to claim 3, wherein said heat-recovery fluid circuit means includes a heat-recovery fluid circuit of said first reactor unit and a separate heat-supply fluid circuit of said second reactor unit, both of said circuits being connected to heat storage means for transferring heat from said heat-recovery fluid circuit to said heat-supply fluid circuit.

5. A device according to claim 1, including a heat storage device, heat-recovery fluid circuit means operating selectively to couple said heat storage device to the selected reactor of said second reactor unit in said adsorption mode for transferring heat from that reactor to said storage device, and a heat-utilization fluid circuit connected to said heat storage device and drawing heat therefrom.

6. A device according to claim 1, including a cold-utilization fluid circuit connected to said evaporator means of said second reactor unit and drawing cooling therefrom.

7. A device for continuous production of heat and cold, comprising:
   a first adsorption reactor unit and a second adsorption reactor unit,
   each reactor unit comprising a condenser, an evaporator coupled to said condenser, at least two adsorption reactors utilizing the same solid-fluid adsorbent-refrigerant pair, refrigerant lines running from each reactor to said evaporator and to said condenser, and valve means disposed in said refrigerant lines selectively coupling each reactor alternately to said condenser and said evaporator while simultaneously coupling another reactor to the other of said condenser and said evaporator, thereby providing a refrigerant flow path between the coupled reactors by way of said condenser and said evaporator, the reactors being coupled to said condenser for operation in a desorption mode and being coupled to said evaporator for operation in an adsorption mode, a heat-supplying fluid circuit running from a heat source to all of said reactors, and valve means in said heat-supplying fluid circuit alternately coupling and uncoupling each reactor to and from the heat source, with each reactor being coupled to the heat source for operation in said desorption mode and uncoupled from said heat source for operation in said adsorption mode,
   the solid-fluid adsorbent-refrigerant pair of said first reactor unit being different from that of said second reactor unit, and
   the heat-supplying fluid circuit of said first reactor unit being coupled to an external heat source and the heat-supplying fluid circuit of said second reactor unit being coupled to a heat output of said first reactor unit such that said first and second reactor units operate in cascade.

8. A device according to claim 7, wherein each reactor unit includes only two reactors each of which is coupled inversely of the other alternately to the corresponding condenser and evaporator.

9. A device according to claim 7, wherein said first reactor unit includes a heat-recovery fluid circuit running to each of said reactors thereof and valve means in said heat-recovery fluid circuit selectively connecting each of those reactors into said heat-recovery fluid circuit, such connecting being effected when the selected reactor is coupled to the evaporator of said first reactor unit for operation in said adsorption mode, and wherein said heat-recovery fluid circuit is coupled to the heat-supplying fluid circuit of said second reactor unit and transfers recovered heat of adsorption thereto.

10. A device according to claim 9, wherein said heat-recovery fluid circuit of said first reactor unit is coupled to said heat-supplying fluid circuit of said second reactor unit through a heat storage device which stores heat generated by said first reactor unit.

11. A device according to claim 7, including a fluid circuit coupling said evaporator of said first reactor unit to said condenser of said second reactor unit and transferring cooling produced at said evaporator of said first reactor unit to said condenser of said second reactor unit.

12. A device according to claim 7, including a heat storage device connected to a heat output of said second reactor unit, said heat storage device being coupled to a heat-utilization fluid circuit.

* * * * *